United States Patent [19]

Kransteuber et al.

[11] Patent Number: 5,606,435
[45] Date of Patent: Feb. 25, 1997

[54] FIBER OPTIC-BASED CORRELATING AND SENSING SYSTEM

[75] Inventors: Amy S. Kransteuber; Don A. Gregory, both of Huntsville Madison, Ala.

[73] Assignee: The United States of America as represented by the Secretary of the Army, Washington, D.C.

[21] Appl. No.: 578,007

[22] Filed: Dec. 22, 1995

[51] Int. Cl.$^6$ .............................. G03H 1/16; G02B 27/46
[52] U.S. Cl. .............................. 359/29; 359/34; 359/559; 382/210; 382/280
[58] Field of Search .............................. 359/29, 559, 561, 359/34; 382/210, 280

[56] References Cited

U.S. PATENT DOCUMENTS

| | | | |
|---|---|---|---|
| 4,150,360 | 4/1979 | Kopp et al. | 359/559 |
| 4,664,516 | 5/1987 | Coppa et al. | 359/559 |
| 5,136,666 | 8/1992 | Anderson et al. | 359/3 |
| 5,216,529 | 6/1993 | Paek et al. | 359/559 |

*Primary Examiner*—Jon W. Henry
*Attorney, Agent, or Firm*—Hugh P. Nicholson; Hay Kyung Chang

[57] ABSTRACT

The fiber optic-based correlating and sensing system (the System) utilizes a length of optical fiber through which the object beam travels prior to being incident on the holographic plate. First, a matched filter is created on the holographic plate of the initial condition of the environment. Then when the plate is re-placed in its original position in the System and the reference beam is blocked from reaching the plate, a correlation peak appears as the object beam passes through the holographic plate. To use the System as a correlator, the object beam is transmitted through an input scene prior to its travel through the optical fiber. The changes in the input scene from the initial scene causes broadening of the shape of and degradation of intensity of the correlation peak. To use the System as a sensor, the object beam travels through the optical fiber acquiring information regarding the environment surrounding the fiber, such as pressure, temperature, sound, electric and magnetic fields. Again, the changes in the environment are indicated by the broadening shape and decreased intensity level of the correlation peak.

13 Claims, 1 Drawing Sheet

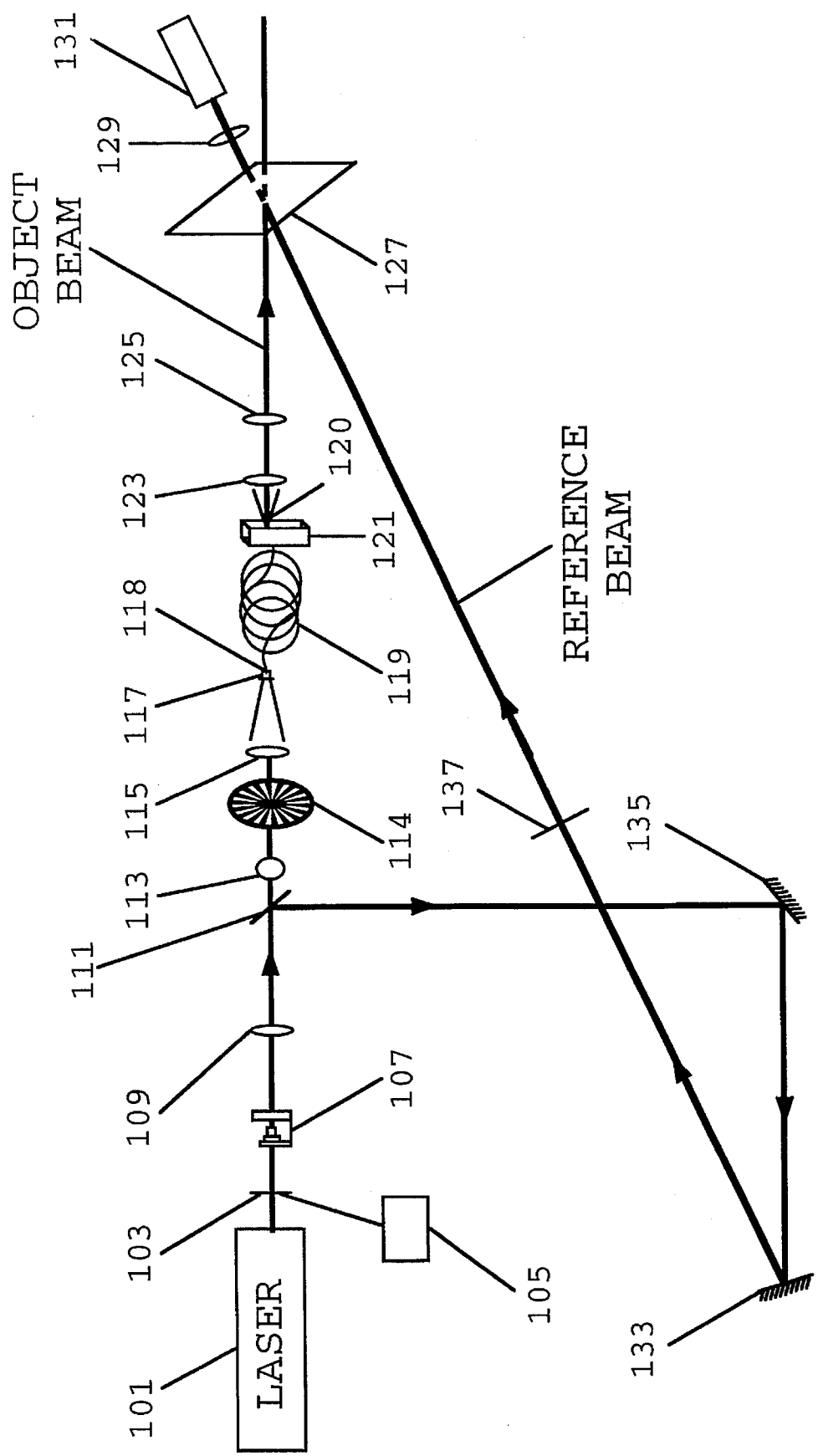

FIBER OPTIC-BASED CORRELATING AND SENSING SYSTEM

DEDICATORY CLAUSE

The invention described herein may be manufactured, used and licensed by or for the Government for governmental purposes without the payment to us of any royalties thereon.

BACKGROUND OF THE INVENTION

Classical correlators are used to compare a scene with information previously stored in matched filters. A correlation is represented by the presence of a bright spot of light, the correlation peak, on the detector. The quality of the correlation peak indicates how well the scene of interest optically matches the stored reference scene.

SUMMARY OF THE INVENTION

A fiber optic-based correlating and sensing system (hereinafter, System) utilizes a length of optical fiber to transmit therethrough the object beam which eventually interferes with a plane wave reference beam to create matched filters. The matched filters are then used in sensing applications as well as classical correlations. The sensing applications are enabled by the variations that occur in the quality and intensity of the correlation peak depending on the changes in pressure, ambient temperature and sound, electric and magnetic fields surrounding the optical fiber and physical displacement of the fiber. Such occurrence of variations enables the detection of even subtle disturbances in the vicinity of the System.

DESCRIPTION OF THE DRAWING

The single FIGURE illustrates the preferred embodiment of the System.

DESCRIPTION OF THE PREFERRED EMBODIMENT

Using the System as illustrated in the FIGURE, a baseline matched filter is first made, thereby creating a recording of the environmental condition or scene surrounding optical fiber 119 at some initial point in time. Against this "stored" scene are compared subsequent scenes or environments with any changes in them being indicated by the shape and light intensity level of the correlation peak.

Turning now to the FIGURE wherein like numbers refer to like parts and arrows indicate the direction of optical travel, the structure and operation of the System is explained in detail.

To make the baseline matched filter, laser 101 of moderate power, such as a Helium-Neon laser, emits the original beam that impinges on spatial filter 107 whereby the original beam is filtered to improve its spatial coherence. The filtered original beam then is collimated by first collimating lens 109 prior to being incident on beamsplitter 111. The beamsplitter separates the original beam into object beam which, being transmitted through., proceeds toward holographic plate 127 and reference beam which is reflected by the beamsplitter toward mirror 135 eventually to recombine with the object beam at the holographic plate to produce a matched filter. Upon leaving beamsplitter 111, the object beam passes through half-wave plate 113 which rotates the polarization of the object beam as necessary to match the polarization with that of the reference beam. Thence, the object beam passes through pre-selected input scene 114, thereby acquiring information regarding the scene and, now carrying the scenic information, is focussed by focusing lens 115 onto microscope objective 117. The microscope objective collimates the object beam to a diameter suitably small to enter input end 118 of optical fiber 119. The object beam propagates through the length of the fiber and emerges at output end 120 of the fiber. If no input scene is used, then the information acquired by the object beam as it travels through the fiber is descriptive of the environmental condition surrounding the fiber, such as pressure, temperature and electric and/or magnetic fields. The emergent object beam, now containing the environmental information, is re-collimated by second collimating lens 123 and then Fourier-transformed by transform lens 125. The transformed object beam, then, is incident on holographic plate 127 which is positioned in the transform plane. At the holographic plate, the object beam interferes with the plane-wave reference beam that reflects from one or more mirrors, 135 and 133, as shown in the FIGURE. The holographic film plate is then exposed and developed to make a holographic recording of input scene 114 or, if no input scene was used, the environmental conditions surrounding optical fiber 119. This recording is the baseline matched filter.

Subsequently, the holographic plate is replaced at its original position in the system and the reference beam is blocked from the holographic plate by any suitable means such as second shutter 137, thereby allowing only the object beam to strike the holographic plate. If the input scene has not changed and the optical fiber has not experienced appreciable changes in its position, ambient temperature, pressure and electric or magnetic fields, then a portion of the reference beam will be recreated and follow its original trajectory. This recreated beam, when focused by second focusing lens 129, is the correlation peak. A suitable camera 131 is used to detect and observe the characteristics of the correlation peak.

If the subsequent test conditions are identical to the baseline conditions, the correlation peak will be narrow and bright. As test conditions vary more from the baseline conditions, the correlation peak will become broader in shape and dimmer. If the input scene or the environmental conditions change enough, then no correlation peak will be detected by the monitor at all. However, if the change stimuli is removed (i.e. the pressure is removed or the temperature returns to the baseline level), in most cases the System will again show a narrow bright correlation peak. This capability to respond enables the System to function as a real-time sensor. It is thus clear that if the System is to be used as a correlator, then the input scene is the variable factor. The quality (i.e. intensity and shape) of the correlation peak indicates how well the scene of interest correlates to the baseline input scene. If the System is used as a sensor, then the environmental conditions affecting the optical fiber are the variable factors, the greater changes in them resulting in the more decreased quality of the correlation peak.

The above-described fiber optic-based correlating and sensing system may further include first shutter 103 positioned between laser 101 and spatial filter 107 to hinder selectively the transmission of the original beam while allowing the operator of the System to make any necessary adjustments to the System. Shutter control box 105 can be coupled to the first shutter to regulate the shutter's motion at pre-set intervals. Further still, output end 120 of the optical fiber may be mounted onto three-dimensional micropositioning stage 121 so that the position of the output end can be controlled.

The use of optical fiber in the System affords many advantages. For example, the loop of fiber can be laid in the environment that is to be monitored while the remaining optical and electrical components are maintained at another more convenient location. The fiber loop is transparent to electrical scanning equipment and thus can operate without being detected by hostile forces. In addition, the glass fiber can be safely placed in some magnetic and chemical environments that are unsuitable for traditional electronic detectors.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A fiber optic-based correlating and sensing system for recording a given environment and subsequently detecting changes in the environment, said system comprising:

a laser for emitting original beam;

a holographic plate for recording thereon a matched filter;

a beamsplitter, said beamsplitter being positioned between said laser and said plate and being suitable for splitting the original beam into object beam and reference beam, the object and reference beams subsequently combining at said plate to create a matched filter;

a first collimator located between said laser and said beamsplitter to receive and collimate the original beam prior to the original beam's incidence on said beamsplitter;

a first focusing lens for receiving and focusing the object beam that issues from said beamsplitter;

a fiber optic having a first end and a second end;

a microscope objective appropriately positioned to receive the object beam from said first focusing lens and direct the object beam into said first end of said fiber optic to be transmitted therethrough;

a transform lens located between said second end and said plate to perform Fourier transform on the object beam exiting said second end;

a second collimator suitably positioned to receive and re-collimate the object beam exiting said second end prior to the object beam's incidence on said transform lens; and a means for selectively blocking the reference beam from impinging on said plate, such blockage allowing the formation of a correlation peak.

2. A correlating and sensing system as set forth in claim 1, wherein said system further comprises a means for detecting and observing the correlation peak.

3. A correlating and sensing system as set forth in claim 2, wherein said system still further comprises a filter positioned between said laser and said beamsplitter for spatially filtering the original beam to improve the spatial coherence thereof.

4. A correlating and sensing system as set forth in claim 3, wherein said system yet further comprises a half-wave plate located between said beamsplitter and said first focusing lens and suitable for controlling the polarization of the object beam such that the polarization of the object beam matches the polarization of the reference beam at said holographic plate.

5. A correlating and sensing system as set forth in claim 4, wherein said system still further comprises a means for selectively allowing original beam emanating from said laser to reach said first collimator.

6. A correlating and sensing system as set forth in claim 5, wherein said system still further comprises at least one mirror, said mirror being positioned to receive the reference beam from said beamsplitter and reflect the reference beam toward said holographic plate where the reference beam interferes with the object beam to form a matched filter.

7. A correlating and sensing system as set forth in claim 6, wherein said system further still comprises at least one pre-selected input scene, said scene being located in the optical path of the object beam such that the object beam passes therethrough and impinges on said first focusing lens.

8. A correlating and sensing system as set forth in claim 7, wherein said selectively allowing means comprises an electronic shutter and a control box, said shutter being coupled to said control box and being suitably positioned so as to allow the passage of the original beam from said laser to said filter for a given time duration in response to said control box.

9. A correlating and sensing system as set forth in claim 8, wherein said detecting means comprises a CCD camera and a second focusing lens for focusing the correlation peak onto said camera for observation.

10. A correlating and sensing system as set forth in claim 9, wherein said system still further comprises a means for manipulating the position of said second end of said fiber optic.

11. A method for recording the state of a given environment and subsequently detecting changes in the state of the environment, said method comprising the steps of:

emitting a laser beam of a pre-selected frequency;

collimating the laser beam;

dividing the laser beam to produce an object beam and a reference beam;

focusing the object beam into the input end of a fiber optic;

transmitting the object beam through the fiber optic;

collimating the object beam at the output end of the fiber optic;

performing Fourier transform on the outputted object beam;

reflecting the reference beam from a mirror;

combining the reflected reference beam and the Fourier-transformed object beam at a holographic plate, thereby producing a matched filter of the base status of the environment;

blocking the reference beam from impinging on the holographic plate;

allowing the object beam to continue its travel from the laser toward the holographic plate and form a correlation peak; and focusing and observing the correlation peak the shape and intensity of which being indicative of any changes in the environment.

12. A method as set forth in claim 11, wherein said emitting step includes filtering the laser beam prior to said collimating step.

13. A method as set forth in claim 12, wherein said dividing step comprises splitting the laser beam into the object beam and the reference beam and rotating the object beam so that the polarization of the object beam matches that of the reference beam when the two beam combine at the holographic plate.

* * * * *